(12) United States Patent
Sidler

(10) Patent No.: US 8,327,870 B2
(45) Date of Patent: Dec. 11, 2012

(54) SLIDE VALVE WITH SLIDER PLATE SEALING MECHANISM

(75) Inventor: Hans-Jorg Sidler, Eschenbach (CH)

(73) Assignee: SISTAG AG Absperrtechnik, Eschenbach (CH)

( * ) Notice: Subject to any disclaimer, the term of this patent is extended or adjusted under 35 U.S.C. 154(b) by 344 days.

(21) Appl. No.: 12/700,156

(22) Filed: Feb. 4, 2010

(65) Prior Publication Data

US 2010/0224815 A1    Sep. 9, 2010

(30) Foreign Application Priority Data

Feb. 5, 2009  (CH) ...................................... 0170/09

(51) Int. Cl.
F16K 3/02  (2006.01)

(52) U.S. Cl. ......... 137/242; 251/329; 251/332; 277/530

(58) Field of Classification Search .......... 251/326–329, 251/332; 137/242–245.5; 277/530
See application file for complete search history.

(56) References Cited

U.S. PATENT DOCUMENTS

| | | | | |
|---|---|---|---|---|
| 2,669,416 A | * | 2/1954 | Hilton | ............................ 251/328 |
| 2,842,283 A | * | 7/1958 | Smith | ............................ 220/262 |
| 2,992,817 A | * | 7/1961 | Templeton | ................... 267/64.18 |
| 3,333,816 A | * | 8/1967 | Williams et al. | ............... 251/327 |
| 3,743,244 A | | 7/1973 | Dickenson et al. | |
| 3,746,303 A | * | 7/1973 | Grove et al. | .................... 251/159 |
| 3,765,647 A | * | 10/1973 | Grove et al. | .................... 251/317 |
| 3,906,992 A | | 9/1975 | Leach | |
| 3,917,223 A | * | 11/1975 | Sidler et al. | .................... 251/214 |
| 4,112,969 A | * | 9/1978 | Still | ............................ 137/454.2 |
| 4,206,905 A | * | 6/1980 | Dobler | .......................... 251/328 |
| 4,279,402 A | | 7/1981 | Wey et al. | |
| 4,314,579 A | | 2/1982 | Wheatley et al. | |
| 4,522,224 A | | 6/1985 | Stadler et al. | |
| 4,546,788 A | | 10/1985 | Stadler et al. | |
| 4,646,777 A | | 3/1987 | Stadler et al. | |
| 4,742,990 A | | 5/1988 | Stadler et al. | |
| 5,013,009 A | | 5/1991 | Nelson | |
| 5,291,912 A | | 3/1994 | Comeaux | |
| 5,549,278 A | * | 8/1996 | Sidler | ........................... 251/328 |
| 6,010,112 A | | 1/2000 | Sidler | |
| 6,203,890 B1 | | 3/2001 | Imamura et al. | |
| 6,935,618 B2 | | 8/2005 | Welty et al. | |
| 7,014,164 B2 | | 3/2006 | Sidler | |
| 7,059,586 B2 | * | 6/2006 | Vanderberg et al. | .......... 251/328 |
| 7,350,766 B2 | | 4/2008 | Comstock et al. | |
| 7,946,556 B1 | | 5/2011 | Trott | |
| 2005/0145818 A1 | * | 7/2005 | Santiago | ........................ 251/327 |
| 2007/0007484 A1 | * | 1/2007 | Zellweger | ..................... 251/327 |
| 2007/0163655 A1 | | 7/2007 | Hunter | |
| 2011/0001076 A1 | | 1/2011 | Sidler | |
| 2011/0049409 A1 | | 3/2011 | Sidler | |

* cited by examiner

Primary Examiner — John Bastianelli
(74) Attorney, Agent, or Firm — Brian Roffe

(57) ABSTRACT

A slide valve for blocking a line conveying media includes a multi-part housing having a passage opening and in which a slider plate operable by a drive component is moved longitudinally. To both sides of the slider plate, laterally to its direction of movement, a respective longitudinal seal is disposed above the passage opening in a longitudinal groove in the housing. Each longitudinal seal has an elastic sealing profile and bars adjacent to the latter. Each elastic sealing profile is preferably provided on the front side with two sealing lips spaced apart from one another, touching the slider plate, and in the central region with groove-shaped chambers on both sides.

20 Claims, 2 Drawing Sheets

SLIDE VALVE WITH SLIDER PLATE SEALING MECHANISM

FIELD OF THE INVENTION

The invention relates to a slide valve, in particular for blocking a line conveying media, comprising a multi-part housing which has a passage opening and in which a slider plate operable by a drive component is moved longitudinally, to both sides of the slider plate, laterally to its direction of movement, a longitudinal seal respectively being disposed above the passage opening in a longitudinal groove in the housing, and this longitudinal seal respectively having an elastic sealing profile and at least one bar adjacent to the latter on one side.

BACKGROUND OF THE INVENTION

With slide valves such longitudinal seals are generally disposed above the passage opening and, moreover, rope seals are disposed around these passage openings. Therefore, the medium can not run out between two flat housing parts and the moveable slider plate located between the latter, and so no leakages form. The design of this type of slide valve is described, for example, in is publication EP-A-0 252 367.

Since slide valves constantly need to be designed to be bigger, i.e. nominal passage opening diameters of up to 2000 millimeters or more are required, the problem, in particular with these longitudinal seals, is that the latter are subjected at least partially to higher pressures and contact pressures, on the one hand due to the bending of the housing, and on the other hand due to the wider plates and the resulting higher friction forces. In particular, these longitudinal seals tend to get twisted off, and so they no longer provide sufficient impermeability.

OBJECTS AND SUMMARY OF THE INVENTION

In contrast, the object forming the basis of the present invention was to further develop a slide valve of the type mentioned at the start such that the service life and the sealing function of these longitudinal seals are improved, even with passage openings with large diameters.

The object is achieved according to the invention in that with the longitudinal seals, the respective elastic sealing profile preferably has on the front side two sealing lips spaced apart from one another, touching the slider plate, and in the central region groove-shaped chambers on both sides.

With this solution according to the invention a sealing system for these longitudinal seals has been provided which compensates tolerances and bending on the housing and the slider plate, and permanently withstands the resulting high compressive forces, and so their service life comes close to that of the whole slide valve.

With one advantageous embodiment a bar, which achieves a rasping effect on the surface of the slider plate, is provided on both sides of the sealing profile, and the sealing profile has respectively on the rear side a side piece engaging behind the respective bar. A protective effect upon the sealing lips is thus produced in that the latter are not pushed away to the side between the slider plate and the inner wall of the housing. In addition, these bars support the sealing profile located between the latter.

BRIEF DESCRIPTION OF THE DRAWINGS

In the following an exemplary embodiment of the invention and further advantages of the latter are described in greater detail by means of the drawings. These show as follows.

DETAILED DESCRIPTION OF THE INVENTION

Figure 1:
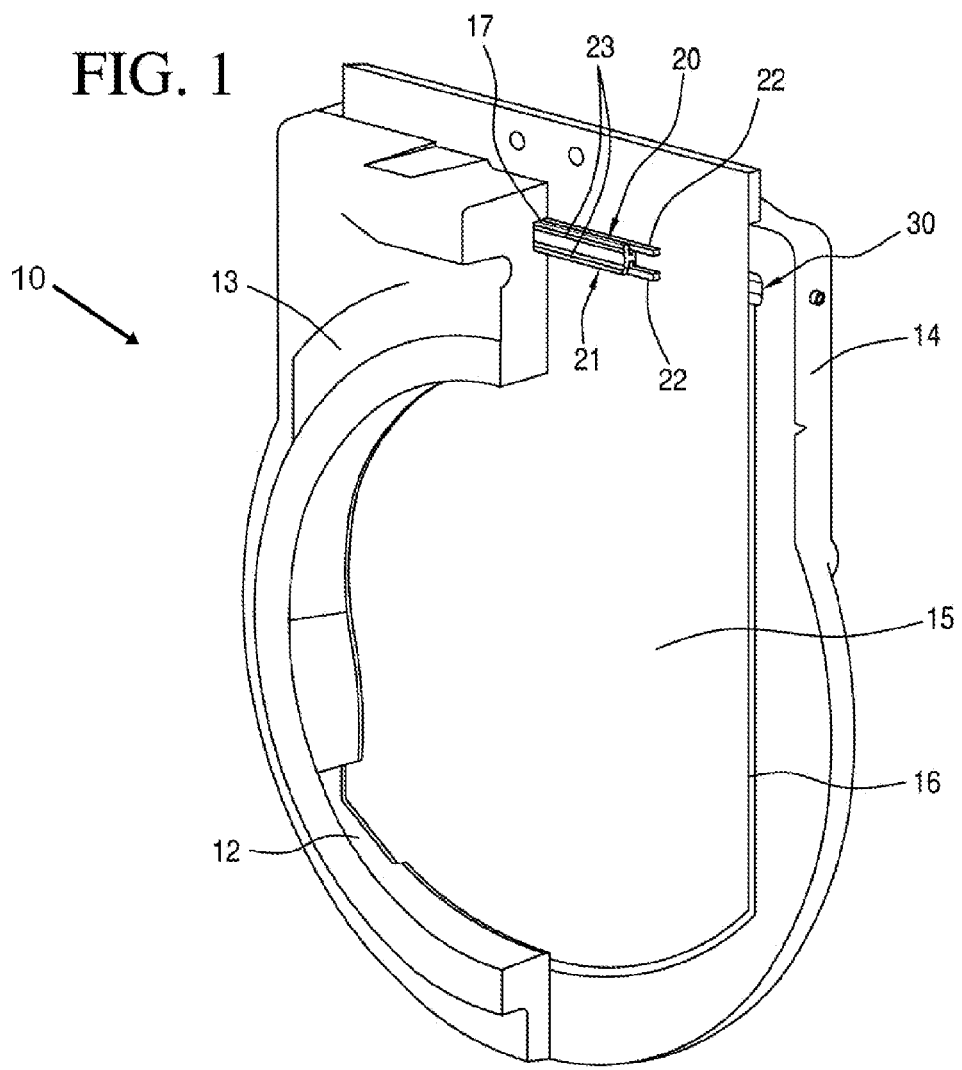
FIG. 1 is a perspective partial view with a partial sectional illustration of the slide valve according to the invention.

FIG. 1 shows a slide valve 10 which is particularly suitable for blocking a line conveying media, in purification plants raw sewage or sludge, in chemistry granulate material, chemical liquids etc., in the food industry drinking liquids, cereals or flushing liquids and similar, for example, being used.

Figure 2:
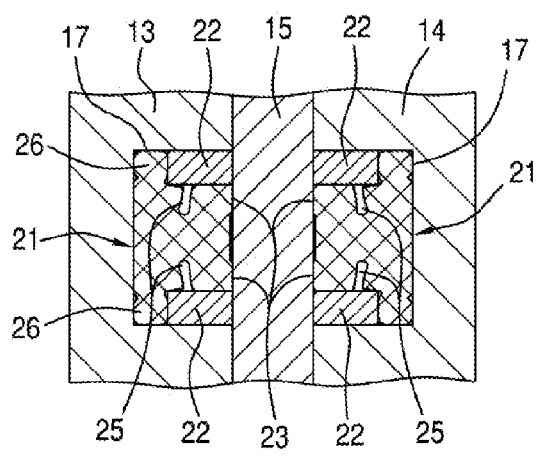
FIG. 2 is a partial section through the longitudinal seals in the braced state of the slide valve.
Figure 3:
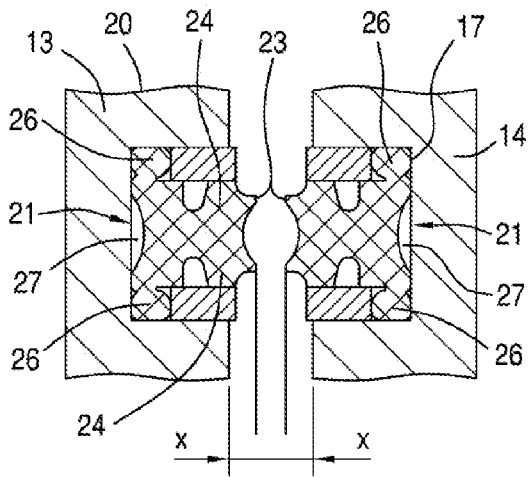
FIG. 3 is a partial section through the longitudinal seals in the non-braced state of the slide valve, i.e. without an incorporated slider plate.

The partially illustrated slide valve 10 has a multi-part housing 13, 14, including a front housing part 13 and a rear housing part 14, provided with a passage opening 12 in which a slider plate 15 operable by a drive component (not shown in detail) is moved longitudinally, and by means of said slider plate 15, the slide valve 10 can be moved from an open position into a position closing the passage opening 12—as shown in FIG. 1. The front housing part 13 is in the longitudinal section, whereas the rear housing part 14 is illustrated in the perspective view. Disposed to both sides of the slider plate 15, laterally to its direction of movement above the passage opening 12, is a respective longitudinal seal 20 in a respective longitudinal groove 17 in the housing 13, 14, i.e., there is a longitudinal groove 17 in front housing part 13 including a longitudinal seal 20 and a longitudinal groove 17 in rear housing part 14 including another longitudinal seal 20 (as shown in FIGS. 2 and 3). In addition, a rope seal 16, which seals the slider plate 15 in the closed position all the way round starting from these longitudinal seals 20, is inserted in the housing 13, 14.

Figure 4:
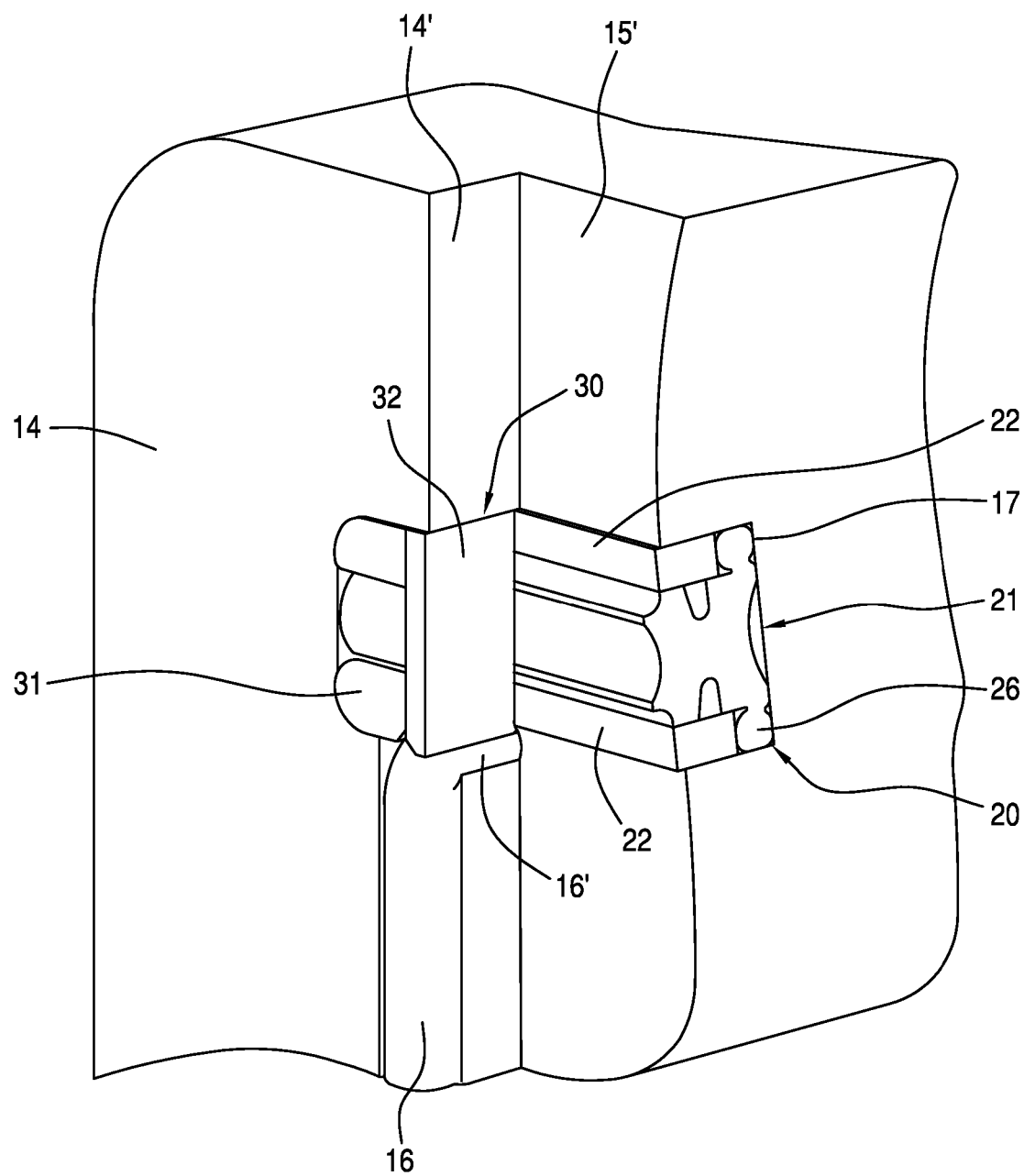
FIG. 4 is a perspective partial view with a partial sectional illustration in the corner region of the longitudinal seal of the slide valve.

The respective or each longitudinal seal 20 has an elastic sealing profile 21 and a respective bar 22 adjacent to the latter on both sides. i.e., there is a bar 22 on one side of the elastic sealing profile 21 and another bar 22 on another side of the elastic sealing profile 21 as shown in FIGS. 1, 2 and 4. With these bars 22, a rasping effect is achieved on the surface of the slider plate 15. If the slider plate 15 is opened upwards out of the closure position, these bars 22 provide rasping away of any medium adhering to the plate surface since the slider plate 15 is advantageously disposed in the region formed beneath the longitudinal seal 20 without any contact with the housing 13, 14.

According to the invention, according to FIG. 2 the respective elastic sealing profile 21 of the longitudinal seal 20 has on the front side two sealing lips 23, spaced apart from one another and touching the slider plate 15 as well as groove-shaped chambers 25 on both sides, approximately in the middle. Moreover, a respective side piece 26 engaging behind the bar 22 is provided on both sides on the rear side of the sealing profile 21.

These projecting sealing lips 23 are respectively disposed in the outer region of the sealing profile 21. Due to the distance formed between one another, these sealing lips 23 enable improved stability of the longitudinal seal, and accordingly also a reduced risk of twisting out when the slider plate 15 is moved. Moreover, these sealing lips 23 are of such a height that in the braced operating state only the latter, and not the rest of the front surface of this sealing profile 21 rest against the slider plate 15.

The groove-shaped chambers 25 in the sealing profile 21 are in the form of side recesses such that in the compressed operating state their inner walls do not touch one another. Due to the formation of these chambers 25 levers 24 are produced on the sealing profile 21 so that a certain adjustability or elasticity of the sealing lips 23 in the direction perpendicular to the slider plate is guaranteed.

In FIG. 3 the cross-section of the design of this longitudinal seal 20, and along with it that of the sealing profiles 21 in the non-braced state is illustrated. Within the framework of the invention the sealing profile 21 is respectively provided with a height such that after insertion into this longitudinal groove 17 contained in the housing 13, 14 it projects perpendicularly out of the latter by a compressible dimension x. This dimension x is chosen such that after bracing, as shown in FIG. 2, this sealing profile 21 exerts a defined contact pressure upon the slider plate.

Furthermore, on the rear side of the sealing profile 21 a longitudinal indentation 27 extending between these side pieces 26 is provided. This longitudinal indentation 27 is preferably provided with a depth roughly that of dimension x so that in the braced operating state, said depth ceases to exist due to the compressed sealing profile. The side pieces 26 located between the bars 22 and the housing 13, 14 are seen to curve in the cross-section.

FIG. 4 shows a section of the rear housing part 14 with a fitted longitudinal seal 20, but without the slider plate 15 which can be inserted into the recess 15'. The longitudinal seal 20 in the longitudinal groove 17 advantageously extends to behind the lateral wall 14' on the housing part 14. In addition, for the side seal, between the slider plate and the housing, in addition to the rope seal 16 a front seal 30 is provided which has a plastically deformable sealing element 31 matched to the shape of the front side of the sealing profile 21, and filling any gaps, and a sealing plate 32 formed in the latter. This sealing plate 32, preferably made of plastic, is adjacent to the bars 22 at the top and at the bottom. The rope seal 16' is arranged laterally beneath this sealing plate 32. Needless to say, these front seals 30 are disposed on both sides of the slider plate 15, as clearly suggested by FIG. 1.

The invention is displayed sufficiently by the exemplary embodiments described above. However, it can also be illustrated by further variants. Thus, in principle this type of bar could also be provided just on this side facing towards the passage opening in this longitudinal seal, and this would mean that the other bar and also the second side piece would be omitted with the sealing profile. The side piece could optionally be provided as a separate rope here.

The invention claimed is:

1. A slide valve, comprising
   a multi-part housing defining a passage opening, a first part of said housing including a groove alongside the passage opening and a second part of said housing including a groove alongside the passage opening;
   a slider plate movable partly in said housing to open and close the passage opening; and
   a longitudinal seal arranged in each of said grooves,
   said longitudinal seal in said groove in said first part of said housing having an elastic sealing profile,
   a first bar adjacent said sealing profile on a first side of said sealing profile, and
   a second bar adjacent said sealing profile on a second side of said sealing profile,
   said sealing profile including
   two sealing lips on a front side spaced apart from one another and arranged to touch said slider plate,
   a first side piece arranged on a rear side behind said first bar,
   a second side piece arranged on a rear side behind said second bar,
   a longitudinal indentation extending between said first and second side pieces, and
   chambers in a central region on both sides,
   said longitudinal indentation having a depth such that when said slider plate closes the passage opening and said sealing lips are touching said slider plate, said longitudinal indentation ceases to exist due to compression of said sealing profile.

2. The slide valve according to claim 1, wherein said sealing profile has a height such that when said slider plate is not touching said sealing profile, said sealing profile projects perpendicularly out of said groove by a compressible dimension (x).

3. The slide valve according to claim 1, wherein sealing lips are arranged in an outer region of said sealing profile.

4. The slide valve according to claim 1, wherein said sealing lips have a height such that when said slider plate closes the passage opening, said sealing lips only rest against said slider plate without the rest of a front surface of said sealing profile.

5. The slide valve according to claim 1, wherein said chambers in said sealing profile are in the form of side recesses such that when said slider plate closes the passage opening, opposing walls defining said chambers do not touch one another.

6. The slide valve according to claim 1, further comprising lateral seals arranged in said housing and that each seal a respective lateral side of said slider plate.

7. The slide valve according to claim 1, wherein said longitudinal seal in said groove in said second part of said housing has an elastic sealing profile, a first bar adjacent said sealing provide on a first side of said sealing profile, and a second bar adjacent said sealing provide on a second side of said sealing profile.

8. The slide valve according to claim 7, wherein said sealing profile of said longitudinal seal in said second part of said housing includes sealing lips on a front side spaced apart from one another and arranged to touch said slider plate, a first side piece arranged on a rear side behind said first bar, a second side piece arranged on a rear side behind said second bar, a longitudinal indentation extending between said first and second side pieces, and chambers in a central region on both sides.

9. The slide valve according to claim 8, wherein said longitudinal indentation of said sealing profile of said longitudinal seal in said second part of said housing has a depth such that when said slider plate closes the passage opening and said sealing lips are touching said slider plate, said longitudinal indentation ceases to exist due to compression of said sealing profile.

10. The slide valve according to claim 1, wherein said longitudinal indentation has a curved cross-section.

11. The slide valve according to claim 1, wherein said slider plate is movable longitudinally and said grooves in said first and second parts of said housing are arranged laterally relative to a direction of movement of said slider plate.

12. The slide valve according to claim 1, wherein said longitudinal seals are arranged above the passage opening.

13. The slide valve according to claim 1, wherein said chambers are groove-shaped.

14. The slide valve according to claim 13, wherein said groove-shaped chambers are in the form of side recesses.

15. The slide valve according to claim 2, wherein said longitudinal indentation has a depth approximately equal to dimension (x).

16. The slide valve according to claim 6, wherein at least one of said lateral seals includes a sealing element having a shape that matches a shape of the front side of said sealing profile.

17. The slide valve according to claim 6, wherein at least one of said lateral seals includes a sealing plate adapted to rest against said slider plate when said slider plate closes the passage opening.

18. The slide valve according to claim 8, further comprising lateral seals arranged in said housing and that each seal a respective lateral side of said slider plate.

19. The slide valve according to claim 18, wherein each of said lateral seals includes a sealing element having a shape that matches a shape of the front side of said sealing profile.

20. The slide valve according to claim 18, wherein each of said lateral seals includes a sealing plate adapted to rest against said slider plate when said slider plate closes the passage opening.

\* \* \* \* \*